United States Patent [19]
Shinjo

[11] Patent Number: 5,219,253
[45] Date of Patent: Jun. 15, 1993

[54] RECESSED SCREW AND A DRIVER BIT ENGAGEABLE THEREWITH

[75] Inventor: Katsumi Shinjo, Osaka, Japan

[73] Assignee: Yugenkaisha Shinjo Seisakusho, Osaka, Japan

[21] Appl. No.: 797,985

[22] Filed: Nov. 26, 1991

[30] Foreign Application Priority Data

Nov. 26, 1990 [JP] Japan .................................. 2-322001

[51] Int. Cl.$^5$ ............................................ F16B 23/00
[52] U.S. Cl. .................................... 411/403; 411/404
[58] Field of Search ............... 411/403, 404, 402, 405, 411/919

[56] References Cited

U.S. PATENT DOCUMENTS

| | | | |
|---|---|---|---|
| 2,182,568 | 12/1939 | Olson | 411/404 |
| 2,777,353 | 1/1957 | Willis | 411/403 |
| 3,604,305 | 9/1971 | Dreger | 411/403 |
| 4,228,723 | 10/1980 | Cunningham | 411/404 X |
| 4,384,812 | 5/1983 | Miyagawa | 411/403 X |
| 4,646,594 | 3/1987 | Tien | 411/403 X |

FOREIGN PATENT DOCUMENTS 164318 12/1985 European Pat. Off. ............ 411/403

Primary Examiner—Rodney M. Lindsey
Attorney, Agent, or Firm—Antonelli, Terry, Stout & Kraus

[57] ABSTRACT

A recessed screw having in its head a recess for engaging with a driver bit, with the recess being defined with curved engaging walls and radial or corner grooves. Each engaging wall is a portion of a conical surface slanted inwardly towards a bottom of the recess. Each corner groove extends outwards from the adjacent engaging walls in radial direction. A pair of vertical side walls, lying parallel with the recessed screw's axis, define each corner groove. The driver bit has protrusions tightly fittable in the recess, which recess may be a superimposition of two square holes disposed symmetrically with a phase shift of 45° around the axis so as to provide eight corner grooves. Each engaging wall may be formed at a place where the side walls intersect one another. The driver bit may comprise a shank and a bit portion which extends from the shank and formed with eight V-shaped grooves extending axially of the bit so that eight blades are defined each between the two V-shaped grooves. A bottom of each V-shaped groove or a top of each blade may be a curved wall to closely contact with the engaging walls in the recess.

2 Claims, 6 Drawing Sheets

RECESSED SCREW AND A DRIVER BIT ENGAGEABLE THEREWITH

BACKGROUND OF THE INVENTION

1. Field of the Invention

The present invention relates to a recessed screw having a recess formed in the head thereof and adapted to receive a driver bit, and, more particularly, to an improved shape of the recess.

The invention further includes a driver bit for use with and engageable with the recessed screw having the improved recess.

2. Description of Prior Art

The most popular recess formed in the screw head for engagement with a driver bit is the so-called Phillips type, in which the recess is of a crossed shape. Generally, the cross-shaped recess has torque transmitting walls which are slanted inwardly towards a bottom of the recess. These slanted walls of the cross-shaped recess are likely to cause the bit to disengage from and slip out of the recess when a large torque is imparted to the bit. In addition to such a problem, a sufficiently large torque cannot be applied to the driver bit because it has only four blades or ridges.

It also has been proposed to employ recesses of shapes including hexagonal recess, in place of the cross-shaped recess, in order that a higher torque can be imparted to the modified recess than in the case of the cross-shaped recess. An example of the modified recesses is shown in FIGS. 9 and 10, in which a screw head 1 has a driver bit-engaging recess 2 composed of two holes square in transverse cross section, as indicated by the phantom lines "A" and "B". The square holes are superimposed one upon another and disposed symmetrically and with a phase shift of 45° around an axis of the screw. Eight corner grooves 3 are each defined by a pair of side walls 4 and 4, which are perpendicular to each other and extend towards a bottom 5 of the recess 2 ( see for example U.S. Pat. Nos. Nos. 3,604,305 and 4,384,812).

It is however noted that the screw having the modified recess 2 as described above has also the side walls 4 which are, similarly to the cross-shaped recess, slanted inwardly towards the bottom 5. Such slanted walls will facilitate the sticking or biting of the driver bit in said recess, but will inevitably cause the so-called "come-out" problem.

It may be possible to form the side walls 4 to extend in parallel with the screw axis so as to avoid the disengagement from the bit. This hypothetical shape will be effective to transmit a higher torque giving a stronger fastening force. However, a slight clearance necessary for the recess to smoothly receive the driver bit is disadvantageous in that the bit will be held in the recess 2 in an engaged state. When the screw is self-drilling or self-tapping screw which is driven at much higher speeds by the driver bit, bit will probably slip out of the hypothetic recess. Further, the initial insertion of the driver bit into the recess will be difficult so that the threading operation is not easily performed by an automatic tool.

SUMMARY OF THE INVENTION

An object of the present invention is to provide an improved recessed screw as well as a driver bit engageable therewith, which recess is shaped such that a smooth and strong initial engaging or biting of the driver bit is ensured and the disengagement of the bent does not occur even when transmitting a high torque, whereby high speed rotation of the bit can be achieved without any problem.

According to the invention, a recessed screw includes a recess in a head thereof for engaging with a driver bit, with the recess being defined with a plurality of engaging walls and a plurality of radial grooves, wherein each sticking wall is a portion of a conical surface slanted inwardly towards a bottom of the recess, and each radial groove, disposed between the two adjacent engaging walls, extending outwardly from the engaging walls in a radial direction, is defined by a vertical wall lying in parallel with an axis of the recessed screw.

In detail, the recess in a preferred mode of the invention is a superimposition of two holes, square in their transverse cross sections, with the holes being disposed symmetrically with a phase shift of 45° around the recessed screw axis so as to provide eight corner grooves as the radial grooves, wherein a pair of side walls as the vertical wall to form each corner groove lie in parallel with the screw axis, whereas each of the conically curved engaging walls is provided at a place where one of the side walls forming one corner groove intersects one of the other side walls forming the other corner groove adjacent to the one corner groove, and each engaging wall is a portion of a conical surface which is inwardly slanted towards the bottom of the recess.

The driver bit used to tighten the recessed screw into an article must basically comprise protrusions adapted to be fitted into the recess. However for use with the preferred type of recessed screw described above, the driver bit may be composed of a shank and a bit portion extending therefrom and having at its extremity a pointed central end. The bit portion is formed with eight V-shaped grooves which extend axially of the driver bit so that eight blades or ridges are defined each between the two adjacent V-shaped grooves. A bottom of each V-shaped groove, that is an extension from feet of adjacent blade, is also a conically curved wall which is adapted to closely contact the conical surface of any of the engaging walls in the recess of the screw head.

Alternatively, according to the invention, each conically curved engaging wall in the recess may be formed as the radial corner groove's bottom where the pair of vertical side walls of each groove intersect one another. Correspondingly, the blades of the driver bit have at their tops the conically curved walls closely engageable with the curved engaging walls in the recess.

Due to the shapes of the cooperating members as described above, with the driver bit being inserted in the screw's recess, the conically curved walls of the driver bit can closely contact and engage with the engaging walls in the recess so that the tight engaging, i.e., biting, of the driver bit is ensured initially and maintained thereafter without failure.

In use, a torque will be applied to the thus fitted driver bit to thereby cause a friction of certain strength between the tightly contacting surfaces. Then, with a higher torque exceeding the friction, the driver bit will rotate a very small angle so that side surfaces of the eight blades come into contact with the corresponding side walls of the corner grooves in the screw's recess, and thus a sufficient torque is transmitted to forcibly rotate the recessed screw.

DETAILED DESCRIPTION OF PREFERRED EMBODIMENTS

Figure 1:
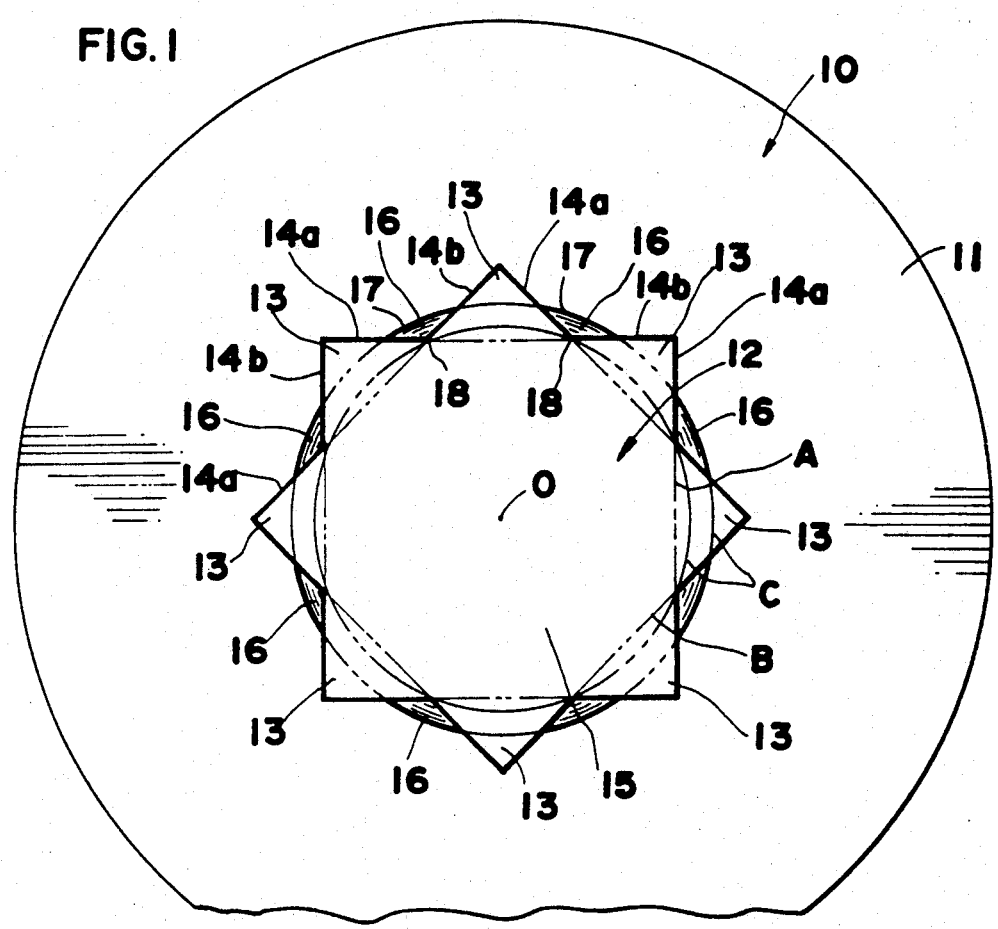
FIG. 1 is a plan view of a recessed screw provided in a first embodiment of the invention.
Figure 2:
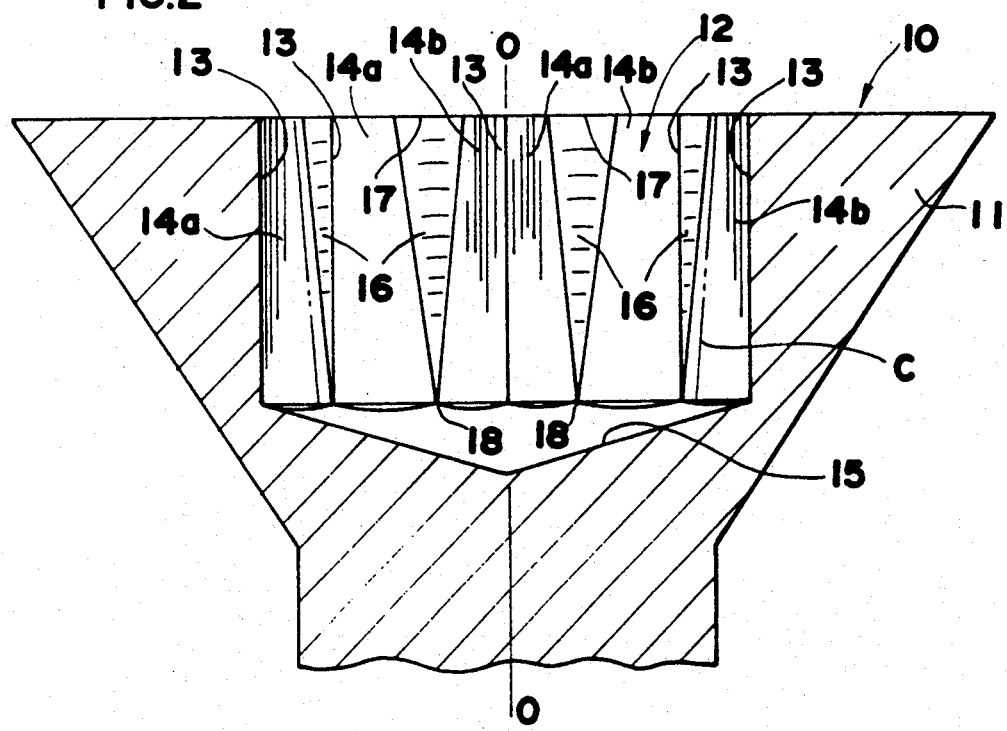
FIG. 2 is a vertical cross section in part of the recessed screw.
Figure 9:
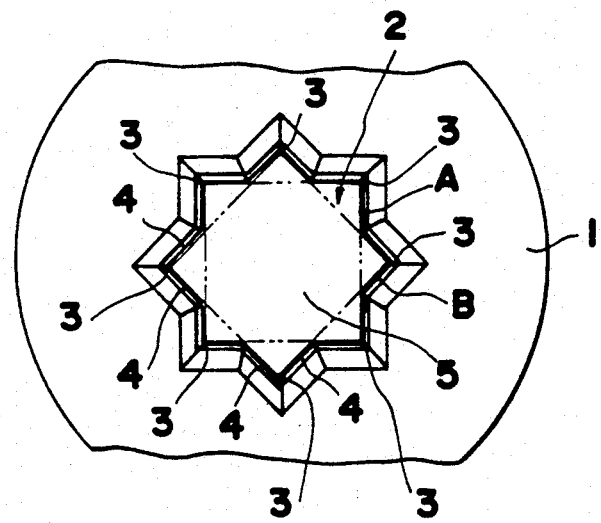
FIG. 9 is a plan view of a prior art recessed screw.
Figure 10:
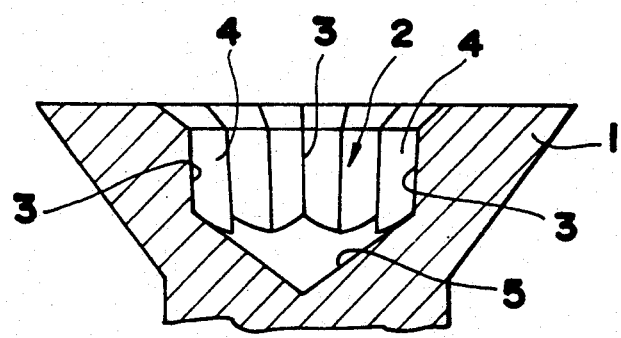
FIG. 10 is a vertical cross section in part of the prior art recessed screw.

Referring now to the drawings wherein like reference numerals are used throughout the various views to designate like parts and, more particularly, to FIGS. 1 and 2, according to these figures, a recessed screw generally designated by the reference numeral 10, constructed in accordance with the present invention, includes a bit receiving recess generally designated by the reference numeral 12 formed in a head of the screw 10 having eight corner grooves 13 formed by superimposing two holes A and B upon one another, which holes A, B are square in transverse cross section and are arranged symmetrical with respect to each other and at a phase shift of 45° around a longitudinal center axis O—O of the recessed screw 10. Similar to the prior art recessed screw shown in FIGS. 9 and 10, each corner groove 13 is basically defined by a pair of side walls 14a, 14b which are perpendicular to each other and extend to a conical bottom of the recess 12.

It is however to be noted that the pair of side walls 14a and 14b forming each corner groove 13 in the recessed screw 10 of the recessed screw of the present invention extend in parallel with the screw axis O—O.

It is another feature of the recessed screw 10 in the invention that the side walls 14a and 14b belonging to two adjacent corner grooves 13 and 13 intersect one another to form a ridge portion therebetween. These ridge portions protruding inwardly of the recess 12, provide curved engages walls 16, which are slanted inwardly and gradually towards the bottom 15 of the recess 12 at a gentle angle of for example at about 10° or less. The curved engaging walls 16 enhance the capability of the driver bit 20 (FIG. 3) to carry out a biting function detailed more fully hereinafter. As indicated by the phantom lines in FIGS. 1 and 2, each engaging wall 16 is a portion of a conical surface "C" having a center line, which coincides with the screw axis O—O and slanted inwardly towards the bottom 15 of the recess 12.

Therefore, transverse width of each curved engaging wall 16 gradually decreases from its upper end 17 towards its lower end 18 where the engaging wall 16 merges into the bottom 15 of the recess. Because the depth of the recess 12 must be designed appropriate in consideration of the thickness of the screw head 11, the lower ends 18 of the curved engaging walls 16 may conversion to a point above and adjacent to the bottom 15.

Figure 3:
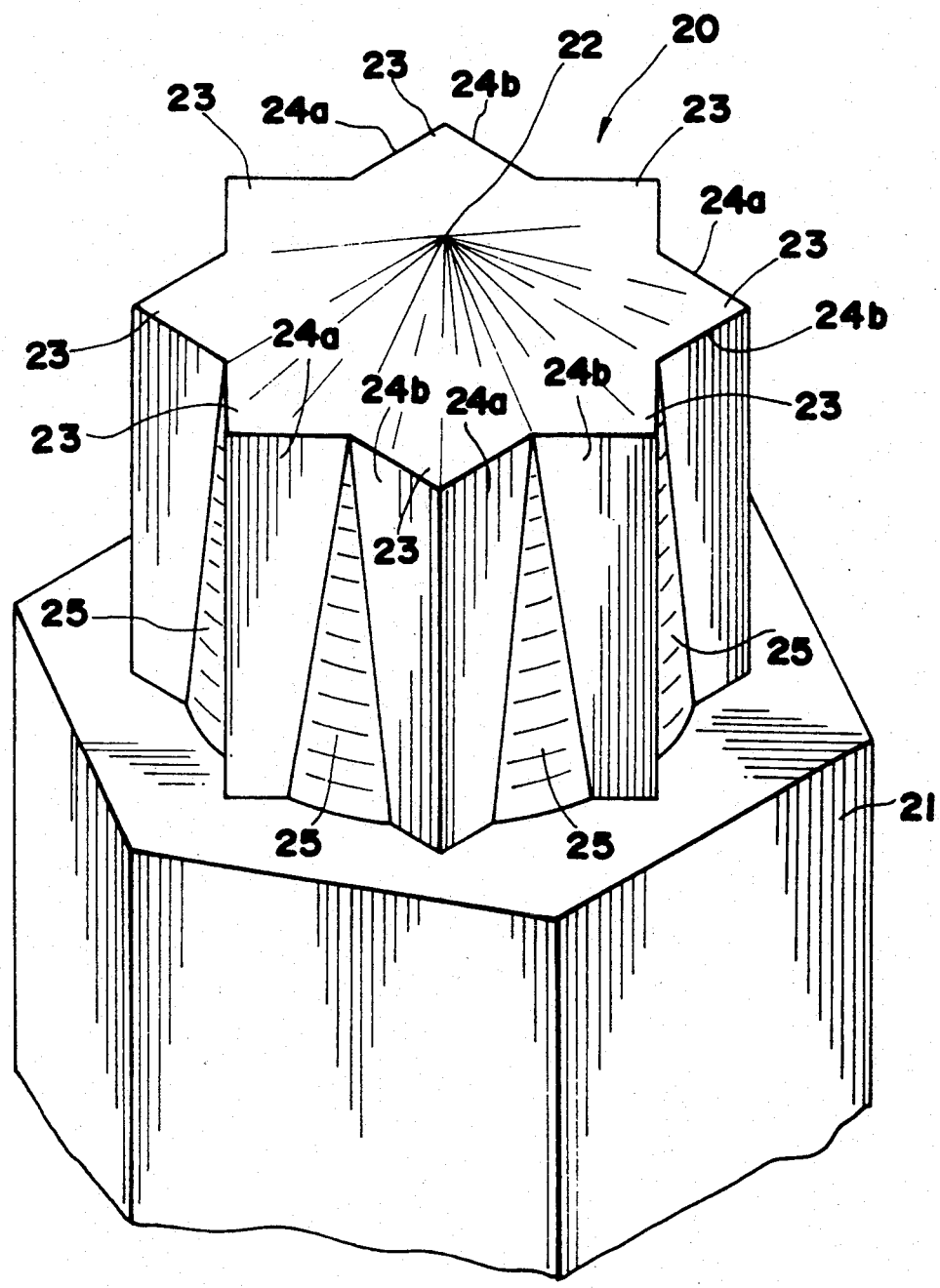
FIG. 3 is a perspective view showing in part a driver bit engageable with the recessed screw.

In use, the driver bit 20 must tightly engage the recess 12 in the recessed screw 10 so as to rotate same, and thus must be of a shape similar to the recess 12 as shown in FIG. 3.

The driver bit comprises a shank 21 and a bit portion integrally extending from the shank and having at its extremity a central pointed end 22. The bit portion between the end 22 and the shank 21 is formed with eight V-shaped grooves which extend axially of the driver bit. Thus, eight blades 23 of a reversed V-shape in cross section are formed to be engageable with the corner grooves 13 in the recess 12. Side surfaces 24a and 24b of each blade 23 are perpendicular to each other, similarly to the side walls 14a and 14b of the corner grooves 13 which are perpendicular to each other as described above. Present at each V-shaped groove's bottom, where the side surfaces 24a and 24b belonging to the adjacent blades 23 and 23 are adjoined one to another, is a connecting plane 25. These planes 25 are conically curved walls tightly engageable with the similarly curved engaging walls 16 in the recess 12. In other words, the connecting planes (i.e., curved walls) 25 are portions of the same conical surface C as are the recess's 12 curved engaging walls 16. Each curved wall 25 of the driver bit may either have a certain width at its tip end, in order to ensure engagement with the curved wall 16 of the recessed screw 10.

Figure 4:
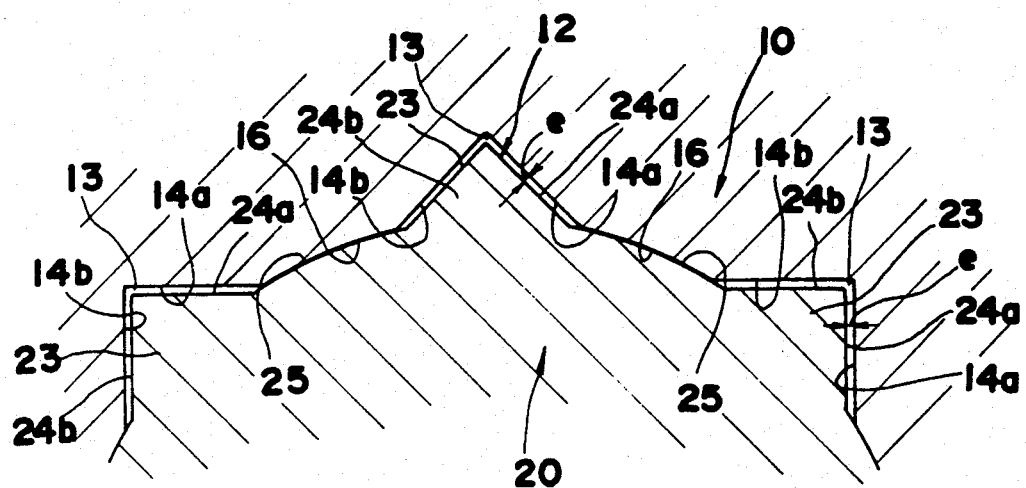
FIGS. 4 and 5 are enlarged cross sections showing the driver bit fitted in and rotating the recessed screw.
Figure 5:
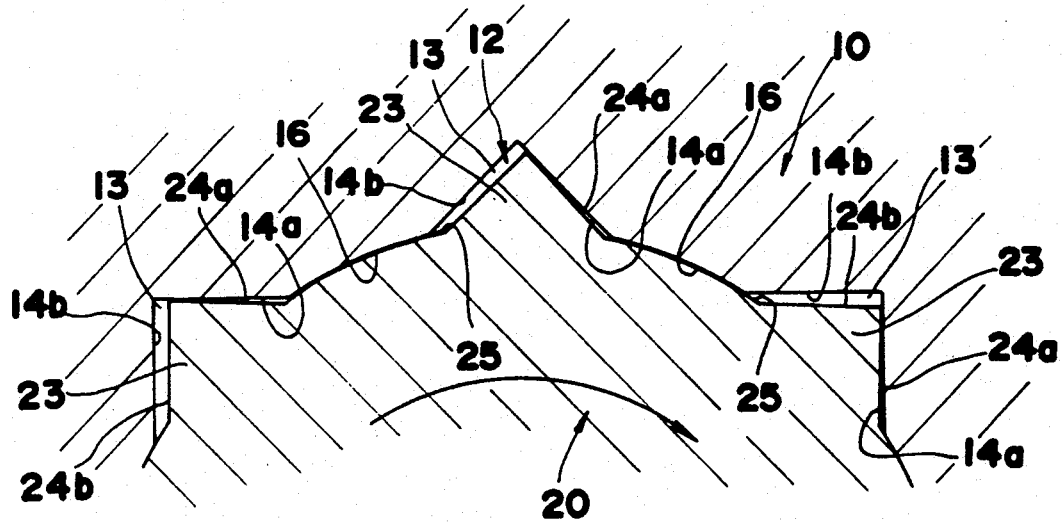

In use of the recessed screw 10, the recessed screw 10 receives the driver bit 20 inserted in the recess 12 in such a state as shown in FIG. 4. The curved engaging walls 16 of the screw 10 come into close contact with the connecting planes (i.e., curved walls) 25 of the bit 20, with all of these walls being the portions of the same and common conical surface "C". Consequently, the biting effect is produced between the former walls and the latter walls, and at the same time clearances "e" take place between each side wall 14a or 14b of the corner grooves 13 and each corresponding side surface 24a or 24b. The clearances "e" are for smooth insertion of the driver bit into the recess. In this initial biting state, an initial torque given to the driver bit 20 will be transmitted to the recessed screw 10 due to a friction between the bitten driver bit and the biting recess. When the torque acting on the driver bit 20 exceeds the friction, the driver bit 20 will rotate only slightly relative to the recessed screw 10 and take a position as shown in FIG. 5. In this state of the members, outer edges of the side surfaces 24a of the eight blades 23 contact with the side walls 14a forming the corner grooves 13. Following this step, a propelling torque of desired strength will be applied to the recessed screw 10. Since both the torque transmitting side surface 24a and torque receiving side wall 14a do extend in parallel with the axis O—O, no component force is produced in axial direction of the driver bit 20. In other words, only the twisting torque will be imparted by the driver bit 20 to the recessed screw 10. It is apparent that the forcible rotation of the driver bit 20 will never cause a disengagement of the driver bit 20 from the recessed screw 10, but effectively transmits necessary torque. The driver bit 20 is thus prevented from slipping out of the recess 12, even when rotated at high speeds.

Figure 6:
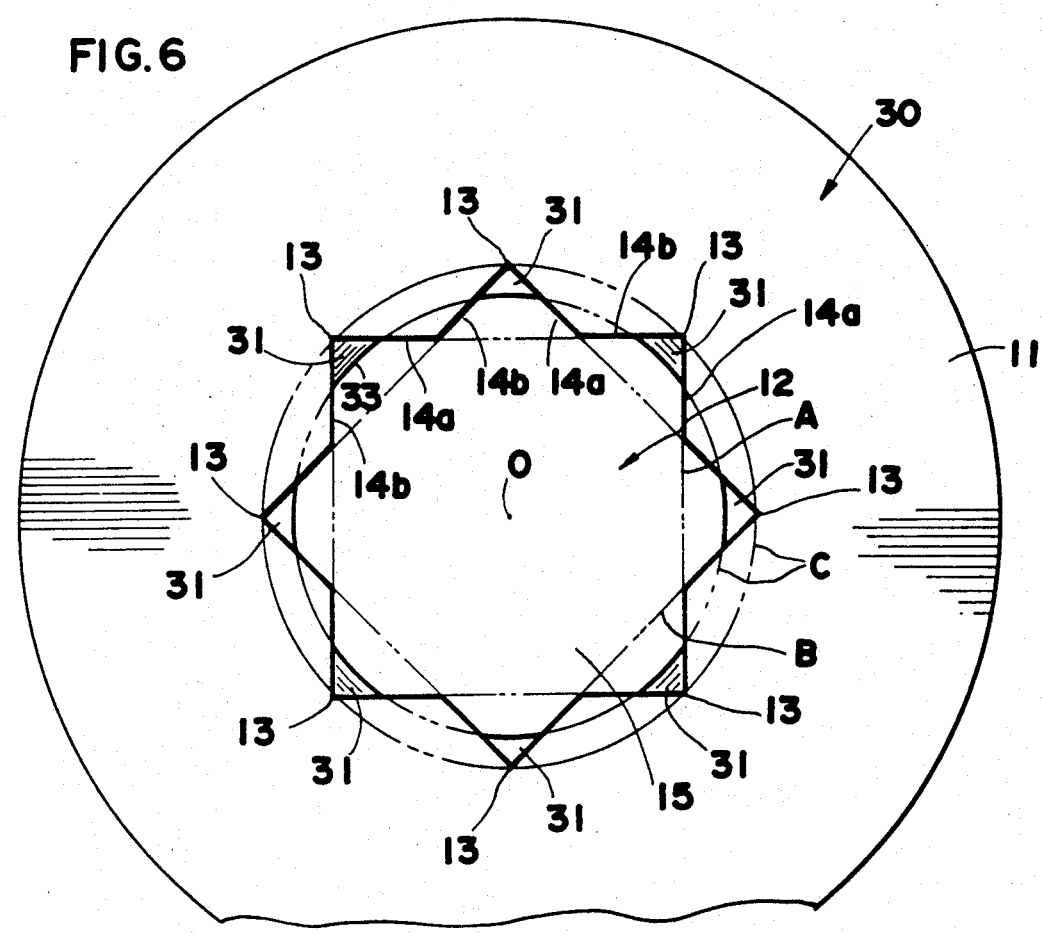
FIG. 6 is a plan view of a recessed screw provided in a second embodiment of the invention.
Figure 7:
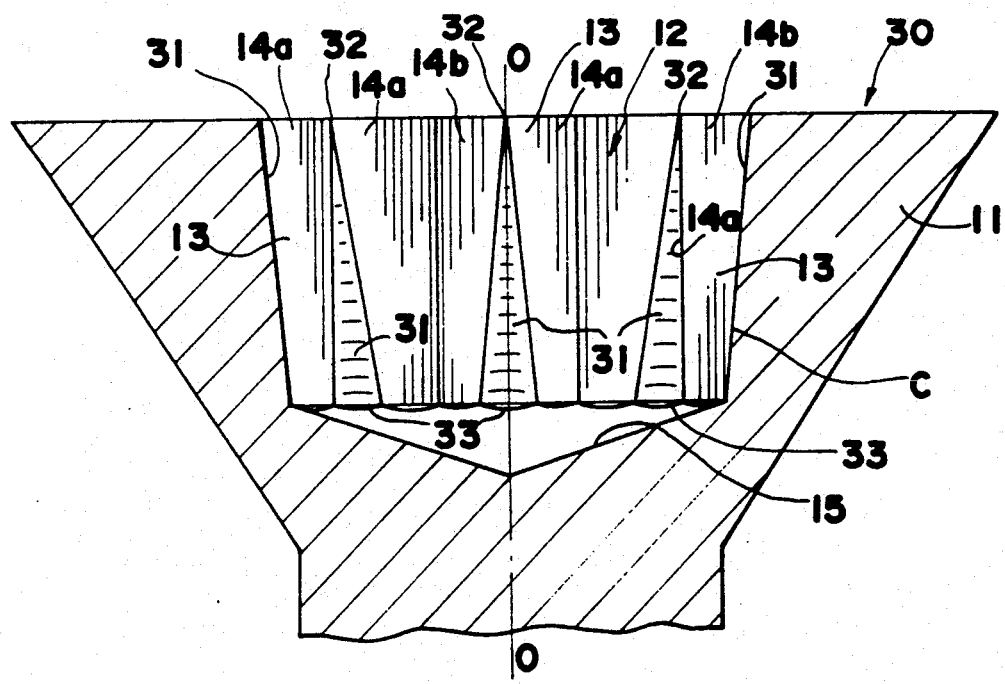
FIG. 7 is a vertical cross section in part of the recessed screw shown in FIG. 6.

FIGS. 6 and 7 show a recessed screw 30 provided in a second embodiment of the present invention. Curved engaging walls 31 for producing the biting effect are formed at places where the side walls 14a and 14b of each corner groove 13 intersect one another, that is at the outermost regions of the corner grooves 13. Also, the engaging walls 31 provided here are portions of the conical surface "C" which is slanted inwardly towards the bottom 15 of the recess 12 and has an axis coinciding with the screw axis O—O, similarly to the recessed screw 10 illustrated in FIGS. 1 to 3. Each engaging wall 31 is widest at its lower end 33 adjoined to the bottom 15 of the recess 12, while its upper end merges into two upper and side edges of the adjacent corner grooves 13.

Figure 8:
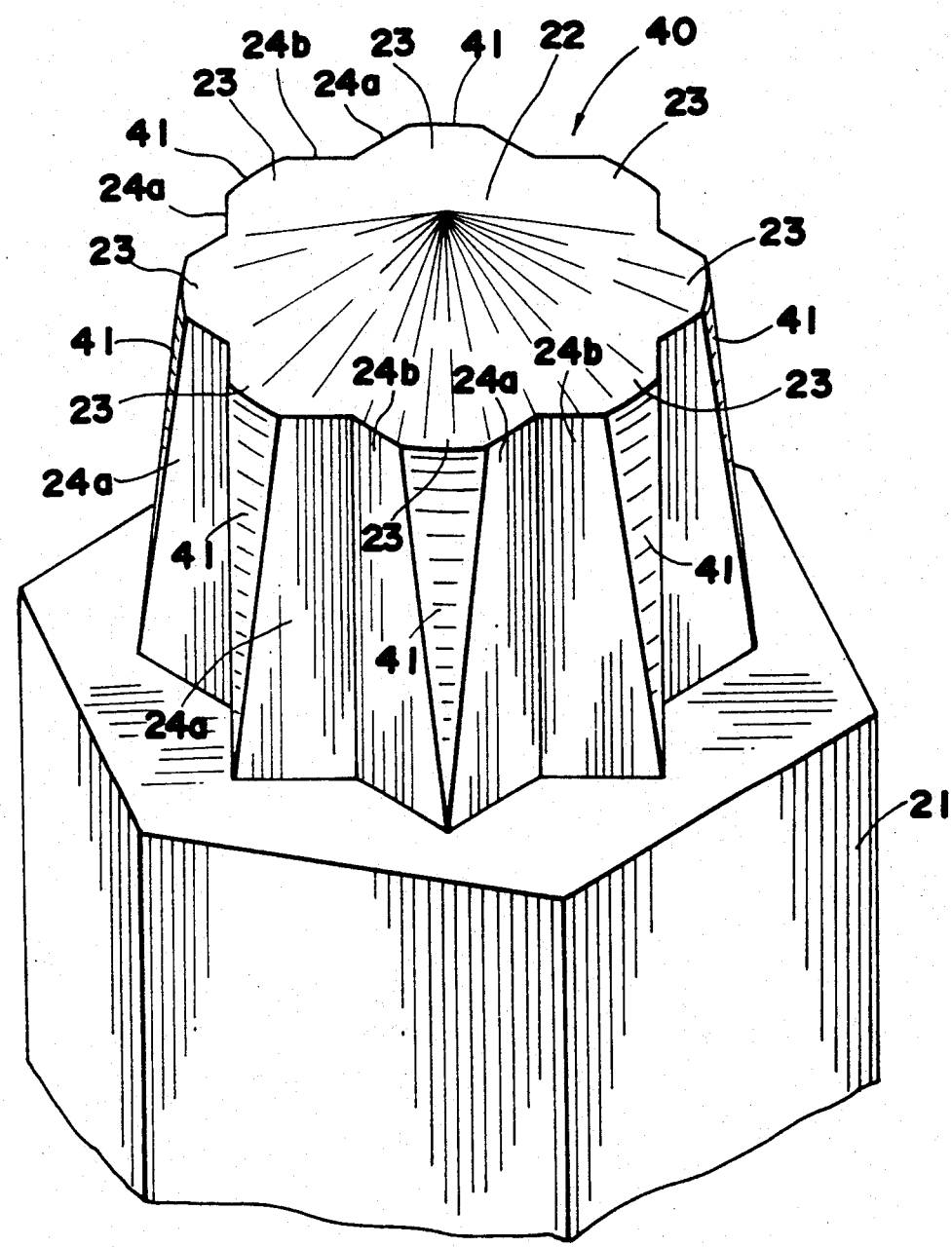
FIG. 8 is a perspective view showing in part a driver bit engageable with the recessed screw shown in FIG. 6.

A driver bit 40 for tightening the recessed screw 30 is shown in FIG. 8, in which a top of each blade 23 is formed as a conically curved wall 41 tightly engageable with the curved engaging wall 31. Similarly to the latter walls 31, the former walls 41 are also portions of the conical surface "C".

The operation for tightening the recessed screw 30 by the driver bit 40 is substantially identical with that for the recessed screw 10 and driver bit 20 which are shown in FIGS. 1 to 3. The biting effect is also produced by contacting the curved walls 41 with the respective engaging walls 31. Outermost edges of the side surfaces of eight blades 23 will similarly come into contact with the side walls 14a of eight corner grooves 13 so that a sufficient torque can be applied to the screw 30, without causing a disengagement of driver bit 40.

In summary, an improved recessed screw and a driver bit engageable therewith which are formed as described above are effective to ensure a sufficiently strong biting action between the screw and the bit, and at the same time a high torque can be transmitted therebetween so as not to result in disengagement of the driver bit. Therefore, high speed rotation thereof is achieved without any problem.

This feature of the recessed screw and mating driver bit is most advantageous for the self-drilling screws which must be driven under a strong torque to rotate at very high speeds.

What is claimed is:

1. A recessed screw comprising:
    a recess formed at a superimposition of two holes, each hole having a square transverse cross section;
    the holes being disposed symmetrically with a phase shift of 45° around a longitudinally extending center axis of the recessed screw; and the recess having;
    eight corner grooves, each being defined by a pair of side walls and lying in parallel with the center axis of the recessed screw; and
    conically curved engaging walls each formed at a position where one of the side walls forming one corner groove intersects one of the other side walls forming the other corner groove adjacent to the one corner groove; and
    wherein each engaging wall is a portion of a conical surface inwardly slanted towards a conical bottom of the recess and converges into a point at a position above the conical bottom of the recess.

2. A recessed screw comprising:
    a recess formed as a superimposition of two holes, each hole having a square transverse cross section;
    the holes being disposed symmetrically with a phase shift of 45° around a longitudinally extending center axis of the recessed screw; and the recess having:
    eight corner grooves, each being defined by a pair of side walls and lying in parallel with the axis of the recessed screw; and
    conically curved engaging walls each formed at a position where the side walls formed each corner groove intersect one another; and
    wherein each engaging wall is a portion of a conical surface inwardly slanted towards a conical bottom of the recess and converges into a point at a position above the conical bottom of the recess.

* * * * *